United States Patent [19]

Kato et al.

[11] Patent Number: 4,764,844
[45] Date of Patent: Aug. 16, 1988

[54] ELECTRONIC COMPONENT WITH TERMINAL CAPS

[75] Inventors: Toshikazu Kato; Kouichi Nitta, both of Yokaichi, Japan

[73] Assignee: Murata Manufacturing Co., Ltd., Japan

[21] Appl. No.: 57,495

[22] Filed: Jun. 3, 1987

[30] Foreign Application Priority Data

Jun. 13, 1986 [JP] Japan .................................. 61-138475

[51] Int. Cl.$^4$ ............................................. H01G 1/13
[52] U.S. Cl. .................................................... 361/308
[58] Field of Search ................. 361/306, 321, 308–310, 361/402, 404; 338/272, 327, 332

[56] References Cited

U.S. PATENT DOCUMENTS

| | | | |
|---|---|---|---|
| 3,416,207 | 12/1968 | Maida | 361/321 X |
| 3,515,958 | 6/1950 | Claypoole et al. | 361/310 |
| 4,004,200 | 1/1977 | Johanson | 361/321 X |
| 4,538,205 | 8/1985 | Laverne | 361/308 |

FOREIGN PATENT DOCUMENTS

| | | |
|---|---|---|
| 2747552 | 5/1979 | Fed. Rep. of Germany ...... 361/310 |
| 479303 | 8/1936 | United Kingdom . |
| 908139 | 8/1960 | United Kingdom . |
| 1139609 | 10/1966 | United Kingdom . |
| 1425211 | 2/1976 | United Kingdom . |
| 2123609 | 6/1983 | United Kingdom . |
| 2125623 | 8/1983 | United Kingdom . |

Primary Examiner—Donald A. Griffin
Attorney, Agent, or Firm—Ostrolenk, Faber, Gerb & Soffen

[57] ABSTRACT

An electronic component comprising a generally cylindrical body having a pair of terminal caps mounted on respective opposite ends of the body. Each of the terminal caps has layers of solder material formed on inner and outer surface areas thereof. The thickness of the layer of solder material on the outer surface area of each of the terminal caps is made smaller than that on the inner surface area of the same terminal cap.

5 Claims, 1 Drawing Sheet

ELECTRONIC COMPONENT WITH TERMINAL CAPS

BACKGROUND OF THE INVENTION

1. Field of the Invention

The present invention generally relates to an electronic component having terminal caps at its opposite ends and, more particularly, to an improvement in the terminal caps for electric connection with an external circuit.

2. Background Art

For the purpose of discussion of the prior art pertinent to the present invention, reference is made to FIGS. 1 and 2 of the accompanying drawings which illustrate different types of ceramic capacitors in longitudinal sectional representations, respectively.

Referring to FIG. 1, the ceramic capacitor shown therein and generally identified by 20 is of a leadless type and comprises an open-ended, generally tubular body 23 made of dielectric material, and a terminal cap 22 mounted on each of the opposite ends of the tubular body 23. The tubular dielectric body 23 has its inner and outer peripheral sufaces deposited with inner and outer electrode layers 24 and 25. The inner electrode layer 24 on the inner peripheral surface of the tubular dielectric body 23 extends from near one of the opposite ends of the tubular dielectric body 23 and over the annular end face of the other of the opposite ends of the same tubular dielectric body 23, terminating on the outer peripheral surface of the tubular dielectric body 23 at a position spaced a slight distance axially inwardly from such annular end face of the other of the opposite ends of the tubular dielectric body 23 so that, when and so long as the corresponding terminal cap 22 is mounted on such other of the opposite ends of the tubular dielectric body 23, the inner electrode layer 24 can be electrically connected with such corresponding terminal cap 22. On the other hand, the outer electrode layer 25 on the outer peripheral surface of the tubular dielectric body 23 extends from one of the opposite ends of the tubular dielectric body 23 towards a position spaced a distance axially inwardly from the other of the opposite ends of the tubular dielectric body 23 so that, when and so long as the corresponding terminal cap 22 is mounted on such one of the opposite ends of the tubular dielectric body 23, the outer electrode layer 24 can be electrically connected with such corresponding terminal cap 22. In any event, each of the terminal caps 22 has a solder layer of substantially uniform thickness electroplated all over the entire surface thereof.

The connection between each of the terminal caps 22 and the associated electrode layer 24 or 25 is carried out in the following manner according to the prior art. After the terminal caps 22 have been mounted on the respective ends of the tubular dielectric body 23 subsequent to the formation of the inner and outer electrode layers 24 and 25, the tubular dielectric body 23 with terminal caps 22 thereon is heated to permit that portion of the solder layer which is deposited on an inner surface area 22a of each of the terminal caps 22 to melt so that the melted solder, when subsequently solidified, can connect the respective terminal cap 22 electrically and physically with the associated electrode layer 24 or 25. In this way, not only are the terminal caps 22 connected electrically with the inner and outer electrode layers 24 and 25, but also the terminal caps 22 are firmly mounted on the tubular dielectric body 23.

The tubular dielectric body 23 with the terminal caps 22 soldered respectively to the inner and outer electrode layers 24 and 25 is then subjected to a sheathing process during which first a sheathing material in a fluidized state is applied through a transfer applicator roll, supported for rotation in one direction in a vertical plane and partially immersed in a vessel containing the fluidized sheathing material, for example, synthetic resin, to the tubular dielectric body 23, then tumbling over the outer periphery of the applicator roll being rotated, thereby forming a generally cylindrical protective coating 26 to complete the leadless ceramic capacitor 20.

Shown by 30 in FIG. 2 is the ceramic capacitor of axial lead type, that is, the ceramic capacitor having a pair of axially extending lead wires 31 extending outwardly from the respective terminal caps 22. The axial lead type shown in FIG. 2 is substantially identical in structure with the leadless ceramic capacitor 20 of FIG. 1 except for the lead wires 31. Also however, the outer protective coating 26 forming a sheath on the ceramic capacitor 30 substantially completely encases the ceramic capacitor 30 except for the lead wires 31, which are permitted to protrude outwards for electric connection with the external circuit.

The soldering of each terminal cap 22 hitherto carried out in the manufacture of any one of the ceramic capacitors 20 and 30 has the following problems. Specifically, where the thickness of the solder layer formed on each of the terminal caps 22 is small, the molten solder will not be uniformly distributed between the respective terminal cap 22 and the tubular dielectric body 23 because the amount of the molten solder on the inner surface area 22a of the respective terminal cap 22 is small. Once this happens, one or both of the terminal caps 22 will not be firmly connected with the respective electrode layer 23 or 24, failing to establish a proper electric connection therebetween. Thus, the reliability of the electric and physical connection between the terminal cap and the associated electrode layers on the tubular dielectric body is reduced.

On the other hand, where the thickness of the solder layer formed on each of the terminal caps 22 is great, the above discussed reliability can be increased because an ample amount of solder exists inside the terminal caps 22. However, the solder deposited on the outer surface area 22b of each of the terminal caps 22 will, when melted and then solidified, form a sagging drop of solder material as indicated by 22c in FIG. 1. The presence of the solder sagging 22c distorts the shape of the resultant ceramic capacitor with the roundness reduced consequently. Because of this, when the ceramic capacitor is subjected to the previously discussed sheathing process, it will fail to rotate smoothly in unison with the rotating applicator roll and, therefore, no smooth and uniform coating of the protective coating 26 can be accomplished.

The irregular shape of the ceramic capacitor resulting from the uneven coating of the sheathing material particularly causes a further problem when the ceramic capacitor is used in connection with an automatic component mounting apparatus operable to automatically mount the electronic components onto printed circuit boards. More specifically, the presence of the sagging 22c in the ceramic capacitor at one or both of the terminal caps 22 allows such ceramic capacitor to be caught somewhere in the automatic component mounting apparatus with the consequence that the ceramic capacitor fails to be properly mounted onto a printed circuit board. In addition, the uneven coating of the sheathing material may bring about reduction in the sealing of the ceramic capacitor which in turn reduces the moisture-proofness of the ceramic capacitor.

On the other hand, when the ceramic capacitor of axial lead type is to be mounted on a printed circuit board with the use of the automatic component mounting apparatus, the lead wires 31 are inserted through associated holes in the printed circuit board and then soldered to printed conductors on the printed circuit board. During the soldering of the lead wires 31 to the printed conductors, heat used for this purpose tends to be transmitted to the terminal caps 22 through the lead wires 31 with the solder layer on the outer surface areas 22b of the respective terminal caps 22 being again melted consequently. When the solder layers are so melted again, and in the event that the thickness of the solder layer on each of the terminal caps is great, the solder tends to undergo a thermal expansion to such an extent as to result in the blow-off of a portion of the solder in the form of a tear-drop from a gap, indicated by 32 in FIG. 2, between the terminal cap 22 and the protective coating 26. Once this occur, the drop of solder so blown off from the ceramic capacitor may constitute a cause of undesirable shortcircuiting.

SUMMARY OF THE INVENTION

Accordingly, the present invention has been devised with a view to substantially eliminating the above discussed problems and inconveniences inherent in the prior art and has for its essential object to provide an improved electronic component having terminal caps, wherein the connection between the terminal caps and the body of the electronic component is reliable and wherein, even if the solder deposited exteriorly on the terminal caps is melted; it will not bring about any adverse influence on the surroundings.

In order to accomplish the above described object, the present invention has the feature that, in each of the terminal caps, the thickness of the solder layer on the outer surface area of the respective terminal cap is made to be smaller than that on the inner surface area of the same terminal cap.

BRIEF DESCRIPTION OF THE DRAWINGS

This and other objects and features of the present invention will become clear from the following detailed description of a preferred embodiment thereof with reference to the accompanying drawings, in which.

DETAILED DESCRIPTION OF THE EMBODIMENT

Figure 1:
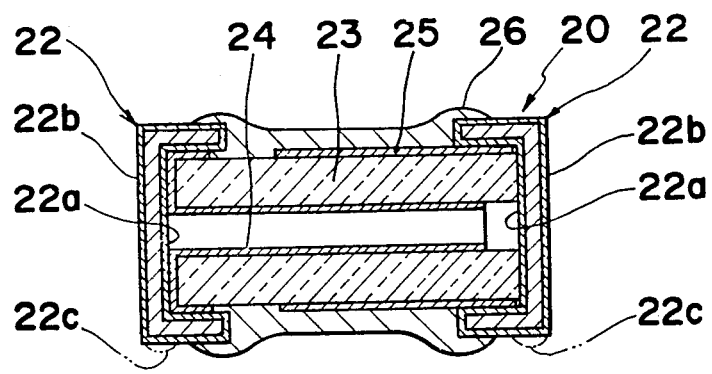
FIGS. 1 and 2 are longitudinal sectional views of the prior art ceramic capacitors of different types, respectively.
Figure 2:
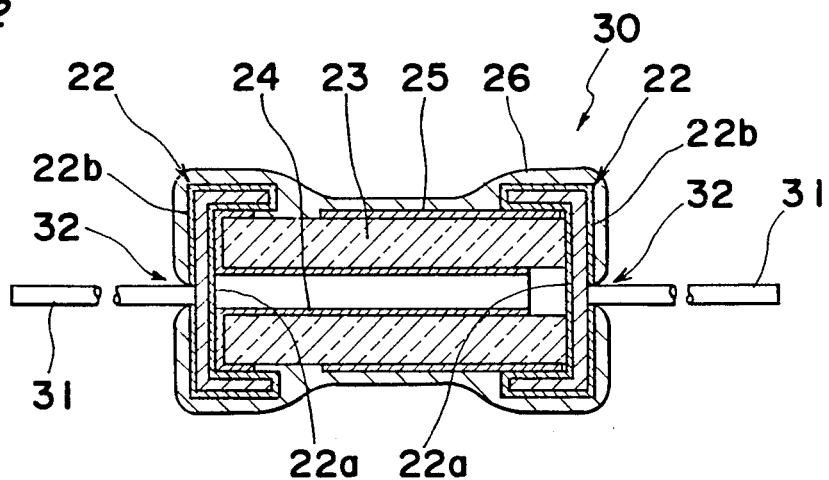

Before the description of the present invention proceeds, it is to be noted that like parts are designated by like reference numerals throughout the accompanying drawings. It is also to be noted that, since ceramic capacitors to which the present invention is applicable may be substantially identical with the prior art ceramic capacitors shown in and described with reference to FIGS. 1 and 2, respectively, only the difference making the present invention a departure from the prior art leadless ceramic capacitor will be described, with particular reference to FIG. 3.

As is the case with the prior art ceramic capacitor, each of the terminal caps 22 mounted on the respective ends of the ceramic capacitor 20 embodying the present invention has its inner and outer surface areas 22a and 22b deposited wih the solder layers. However the solder layers on the inner and outer surface areas 22a and 22b, of each of the terminal caps mounted on the ceramic capacitor 20 embodying the present invention, have different thicknesses as will be specifically described with reference to FIG. 3.

Figure 3:
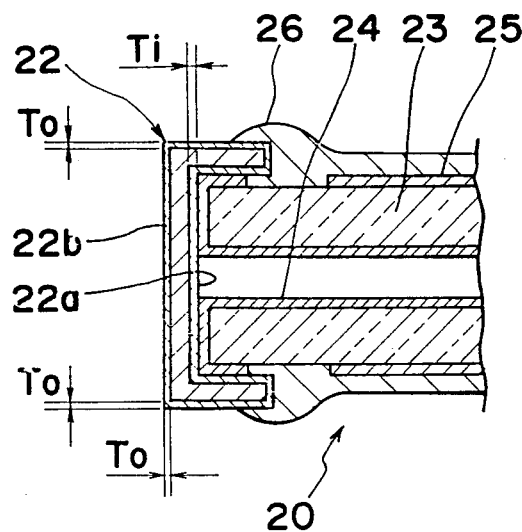
FIG. 3 is a longitudinal sectional view on a somewhat enlarged scale, of one end portion of a ceramic capacitor embodying the present invention.

As best shown in FIG. 3, the solder layer deposited on the inner surface area 22a of each terminal cap 22 has a thickness Ti preferably within the range of 3 to 8 microns, and the solder layer deposited on the outer surface area 22b of the same terminal cap 22 has a thickness To preferably not exceeding 3 microns. This difference in thickness, between the respective solder layers on the inner and outer surface areas 22a and 22b in each of the terminal caps 22 can be achieved by subjecting each terminal cap 22 initially having a solder layer of uniform thickness on both of the inner and outer surface areas 22a and 22b thereof, to a grinding process. More specifically, the solder material is initially deposited on the inner and outer surface areas 22a and 22b to form the respective solder layers of uniform thickness by the use of, for example, an electroplating technique. Then the solder layer on the outer surface area 22b is ground to the predetermined thickness by the use of, for example, a barrel finishing technique.

After the terminal caps 22 so formed according to the present invention have been mounted on the tubular dielectric body 23 and soldered to the opposite ends thereof in any known manner as described in connection with the prior art ceramic capacitor, the protective coating 26 is formed in any known manner also as described in connection with the prior art ceramic capacitor, thereby to complete the ceramic capacitor having the terminal caps.

The leadless ceramic capacitor according to the present invention is, when applied in practice, mounted on a printed circuit board with the terminal caps 22 soldered exteriorly to respective conductors printed on the printed circuit board. At this time, the solder layers formed on the outer surfaces areas 22b of the respective terminal caps 22 facilitates a favorable soldering of the terminal caps 22 to the associated printed conductors.

The foregoing description, although having been made with reference to the leadless ceramic capacitor, can equally apply to the terminal caps to be mounted on the ceramic capacitor of the axial lead type.

In view of the above description of an embodiment of the present invention, it is seen that the solder layer on the inner surface area of each of the terminal caps is formed to a substantial thickness, enough to permit the respective terminal cap 22 to be firmly mounted on the associated end of the tubular dielectric body. At the same time, the thickness of the solder layer on the outer surface area of the respective terminal cap is made smaller than that on the inner surface area there. Therefore, there is no longer any possibility of the formation of a sagging of solder material, such as discussed in connection with the prior art ceramic capacitor, and, therefore, uniform coating of the sheathing material to form the protective coating can be accomplished. In the case of the ceramic capacitor being of the axial lead type, there is no possibility of a portion of the solder material being blown off from a gap between the terminal caps and the respective opposite ends of the tubular dielectric body. In addition, there is no possiblity of the sealing of the ceramic capacitor being reduced as a result of the protective coating.

Although featues of the present invention have been fully described in connection with the preferred embodiment thereof with reference to the accompanying drawings, it is to be noted that various changes and modifications may be apparent to those skilled in the art. By way of example, although in the foregoing description reference has been made to the tubular dielectric body, it may be a generally cylindrical rigid body made of dielectric material. Also the concept of the present invention although having been described as applied to the ceramic capacitor can be equally applicable to a resistor, an inductance element or any electronic component requiring the use of terminal caps.

Accordingly, such changes and modifications are to be understood as included within the scope of the present invention as defined by the appended claims unless they depart therefrom.

What is claimed is:

1. An electronic component comprising a generally cylindrical body having a pair of terminal caps mounted on respective opposite ends of the body, each of said terminal caps having layers of solder material formed on inner and outer surface areas thereof, said inner surfaces of said terminal caps being conductively bonded to such component by said solder material, wherein the thickness of the layer of solder material, on the outer surface area of each of the terminal caps, is made smaller than that on the inner surface area of the same terminal cap, for providing sufficient solder on said inner surfaces for said bonding, while preventing substantial formation of excess solder drops or solder blow-off, when said outer surfaces are soldered or when leads are attached thereto.

2. A component as in claim 1, wherein the solder layer on said inner surface is greater than substantially 3 microns thick, and the solder layer on said outer surface is less than substantially 3 microns thick.

3. A component as in claim 2, wherein the solder layer on said inner surface is at most substantially 8 microns thick.

4. A component as in claim 1, wherein said solder layers are formes on said terminal caps by plating.

5. A component as in claim 4, wherein following said plating the solder layer on the outer surface of each said terminal cap is made thinner by grinding.

* * * * *